(12) United States Patent
Yung et al.

(10) Patent No.: US 7,845,543 B1
(45) Date of Patent: Dec. 7, 2010

(54) APPARATUS AND METHOD FOR BONDING MULTIPLE DICE

(75) Inventors: Chung Sheung Yung, Kwai Chung (HK); Ping Kong Choy, Kwai Chung (HK); Hon Yu Ng, Kwai Chung (HK)

(73) Assignee: ASM Assembly Automation Ltd, Hong Kong (HK)

( * ) Notice: Subject to any disclaimer, the term of this patent is extended or adjusted under 35 U.S.C. 154(b) by 0 days.

(21) Appl. No.: 12/619,811

(22) Filed: Nov. 17, 2009

(51) Int. Cl.
*B23K 31/02* (2006.01)
*B23K 37/00* (2006.01)

(52) U.S. Cl. .............. 228/103; 228/5.5; 228/8; 228/106; 228/180.21; 228/234.1

(58) Field of Classification Search .......... None
See application file for complete search history.

(56) References Cited

U.S. PATENT DOCUMENTS

| | | | |
|---|---|---|---|
| 3,627,190 A * | 12/1971 | Ramsey | 228/5.5 |
| 3,640,444 A * | 2/1972 | Ludwig | 228/5.5 |
| 3,650,454 A * | 3/1972 | Coucoulas | 228/1.1 |
| 3,698,621 A * | 10/1972 | Burke et al. | 228/4.1 |
| 3,774,834 A * | 11/1973 | Holler et al. | 228/5.5 |
| 3,941,297 A * | 3/1976 | Burns et al. | 228/180.21 |
| RE28,798 E * | 5/1976 | Herring et al. | 228/106 |
| 3,973,714 A * | 8/1976 | Lesyk et al. | 228/106 |
| 4,605,833 A * | 8/1986 | Lindberg | 219/56.22 |
| 4,875,614 A * | 10/1989 | Cipolla et al. | 228/5.5 |
| 5,427,301 A * | 6/1995 | Pham et al. | 228/110.1 |
| 5,628,660 A * | 5/1997 | Onitsuka | 445/24 |
| 5,698,068 A * | 12/1997 | Ichikawa et al. | 156/581 |
| 5,839,640 A * | 11/1998 | Kinnaird | 228/4.5 |
| 6,041,996 A * | 3/2000 | Arikado | 228/180.22 |
| 6,122,823 A * | 9/2000 | Kira et al. | 29/840 |
| 6,264,089 B1 * | 7/2001 | Hasegawa et al. | 228/5.5 |
| 6,621,157 B1 * | 9/2003 | Wirz et al. | 257/692 |
| 2003/0098340 A1 * | 5/2003 | Wong et al. | 228/180.5 |
| 2004/0013784 A1 * | 1/2004 | Costa | 426/590 |
| 2004/0089697 A1 * | 5/2004 | Isa | 228/41 |
| 2004/0121513 A1 * | 6/2004 | Taguchi et al. | 438/106 |
| 2004/0206800 A1 * | 10/2004 | Arai et al. | 228/6.2 |
| 2005/0284578 A1 * | 12/2005 | Uchida et al. | 156/349 |
| 2006/0243391 A1 * | 11/2006 | Onituka | 156/358 |
| 2007/0034323 A1 * | 2/2007 | Hiller et al. | 156/230 |
| 2008/0104831 A1 * | 5/2008 | Haji et al. | 29/833 |

(Continued)

FOREIGN PATENT DOCUMENTS

JP    04225244 A  *  8/1992

(Continued)

*Primary Examiner*—Kiley Stoner
(74) *Attorney, Agent, or Firm*—Ostrolenk Faber LLP

(57) ABSTRACT

An apparatus for bonding dice onto one or more substrates placed on a base comprises a first bond head and a second bond head. Each bond head incorporates a bonding tool which is configured for holding a die and both bond heads are driven by at least one linear motion actuator towards the substrate. The first and second bond heads are mounted on a stand and each comprises a locking mechanism which is operative to lock the bond head to the stand, and a compliant mechanism that is actuable to exert a bonding force on the bonding tool to bond each die to the substrate after the bond head has been locked to the stand.

16 Claims, 6 Drawing Sheets

U.S. PATENT DOCUMENTS

| | | |
|---|---|---|
| 2008/0202677 A1 * | 8/2008 | Ok .......................... 156/272.8 |
| 2008/0314264 A1 * | 12/2008 | Kuster ........................ 100/179 |
| 2009/0020229 A1 * | 1/2009 | Yoon et al. .................. 156/350 |
| 2009/0098667 A1 * | 4/2009 | Behler et al. .................. 438/15 |
| 2009/0120589 A1 * | 5/2009 | Kang et al. .................. 156/539 |
| 2009/0141275 A1 * | 6/2009 | Han et al. .................... 356/400 |
| 2010/0047043 A1 * | 2/2010 | Burke et al. ................. 414/217 |

FOREIGN PATENT DOCUMENTS

| | | | |
|---|---|---|---|
| JP | 2003-142507 A | * | 5/2003 |
| JP | 2003-289090 A | * | 10/2003 |
| JP | 2003-311601 A | * | 11/2007 |

* cited by examiner

APPARATUS AND METHOD FOR BONDING MULTIPLE DICE

FIELD OF THE INVENTION

The invention relates to the bonding of semiconductor dice onto substrates.

BACKGROUND AND PRIOR ART

Production of electronic packages involves picking a semiconductor chip or die from a tray or wafer and placing it on a substrate on which it is to be bonded. The bonding between the die and the substrate, which can be glass, printed circuit board or ceramic, is achieved using solder or adhesive while applying heat and force. The solder or adhesive is deformed under heat and force and electrical connection is established between the die and the substrate.

The apparatus used to apply heat and force is referred to as a bond head. FIG. 1 is a side view of a conventional die bonding apparatus 100. The bonding apparatus 100 includes a bond head 103 comprising a bonding tool 104. The bonding tool 104 holds a die 106 and is driven directly by a pneumatic cylinder 102 towards a substrate positioned on top of a base 108 of the bonding apparatus 100. Motion of the bond head 104 is guided by a linear guide 110 which is mounted onto a stand 112, and which in turn rests on the base 108. Upon contact, the die 106 held by the bonding tool 104 is bonded onto the substrate using force exerted from the pneumatic cylinder 102 and heat produced from the bonding tool 104 and/or base 108.

Since the die may be of various sizes and configurations, the force that has to be applied on the die typically depends on the number of electrical connections between the die and substrate. The force applied will have to be greater if there are more electrical connections. The aforesaid prior art utilizes an electromagnetic actuator or pneumatic cylinder 102 to apply a bonding force onto the die. The force required typically varies from 5 gf to about 50 kgf.

To increase throughput, some bonding machines provide multiple bonding heads in order to bond more than one die simultaneously. As the number of electrical connections between the die and substrate increases, the force that has to be provided by the bond head becomes larger, and bigger electromagnetic actuators or pneumatic cylinders have to be used. These requirements demand that a gap between separate bond heads should be at least 40-50 mm. Bonding of multiple dice on the substrate with small inter-spacing simultaneously is thus not possible. This limits the throughput when, for instance, there is a need to bond multiple dice simultaneously onto a small LCD panel.

SUMMARY OF THE INVENTION

It is thus an object of the present invention to seek to provide an compact apparatus and method for bonding multiple dice using a high bond force which overcomes some of the aforesaid limitations of conventional die bonding systems, especially when bonding dice onto smaller substrates.

According to a first aspect of the invention, there is provided an apparatus for bonding dice onto one or more substrates placed on a base, the apparatus comprising: a first bond head and a second bond head, each incorporating a bonding tool configured for holding a die; at least one linear motion actuator for driving both the first and second bond heads towards the substrate; and a stand on which the first and second bond heads are mounted; wherein each bond head further comprises a locking mechanism operative to lock the bond head to the stand, and a compliant mechanism that is actuable to exert a bonding force on the bonding tool to bond each die to the substrate after the bond head has been locked to the stand.

According to a second aspect of the invention, there is provided a method for bonding dice onto one or more substrates placed on a base, comprising the steps of: holding first and second dice with first and second bonding tools incorporated in respective first and second bond heads; driving the first and second bond heads towards the substrate with at least one linear motion actuator so that the dice contact the substrate; locking the first and second bond heads to a stand on which the first and second bond heads are mounted; and thereafter actuating first and second compliant mechanisms located on the first and second bond heads respectively to apply bonding forces on the bonding tools to bond the dice to the substrate.

It will be convenient to hereinafter describe the invention in greater detail by reference to the accompanying drawings. The particularity of the drawings and the related description is not to be understood as superseding the generality of the broad identification of the invention as defined by the claims.

BRIEF DESCRIPTION OF THE DRAWINGS

The present invention will be readily appreciated by reference to the detailed description of a preferred embodiment of the invention when considered with the accompanying drawings, in which.

DETAILED DESCRIPTION OF THE PREFERRED EMBODIMENT OF THE INVENTION

Figure 1:
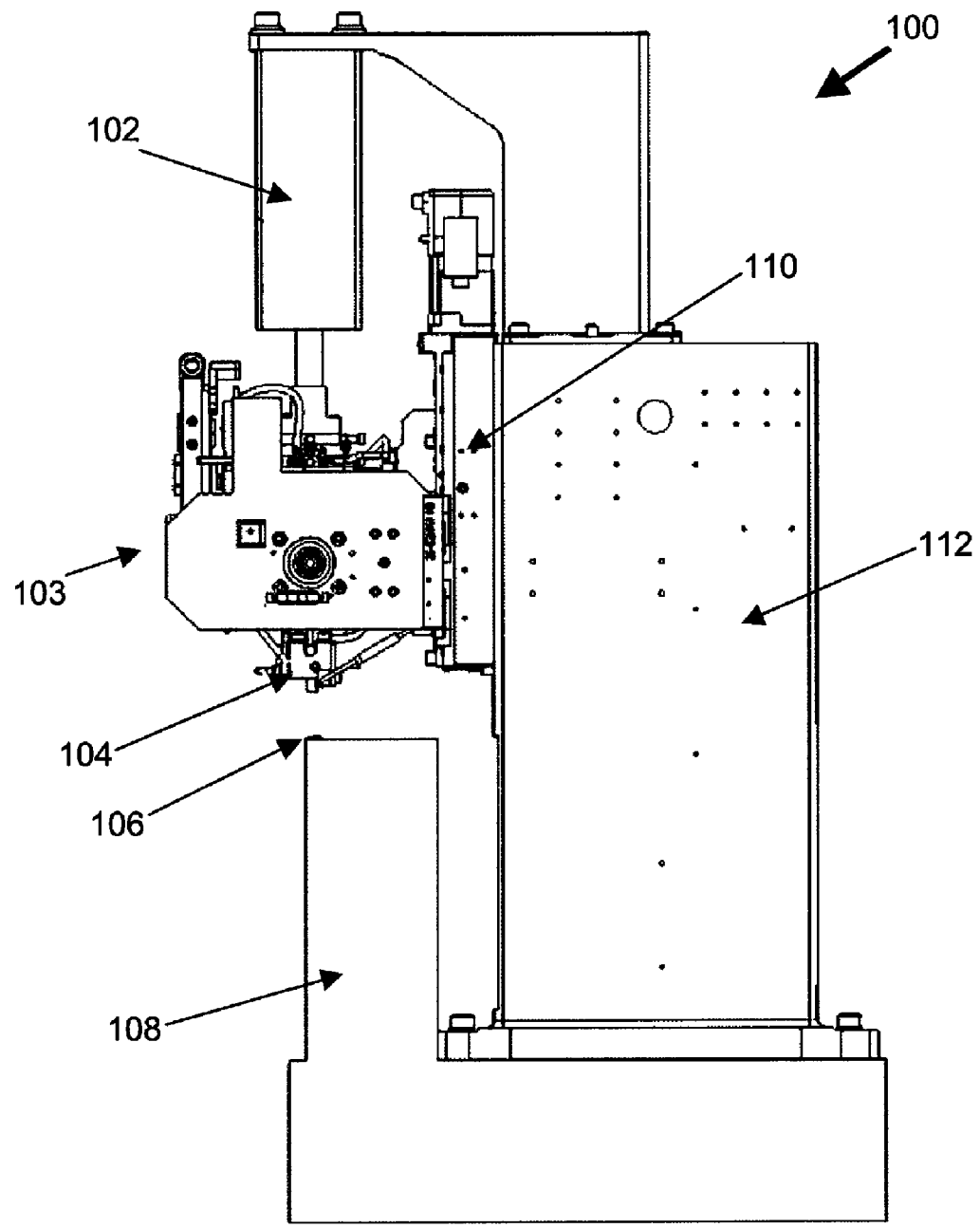
FIG. 1 is a side view of a conventional die bonding apparatus.
Figure 2:
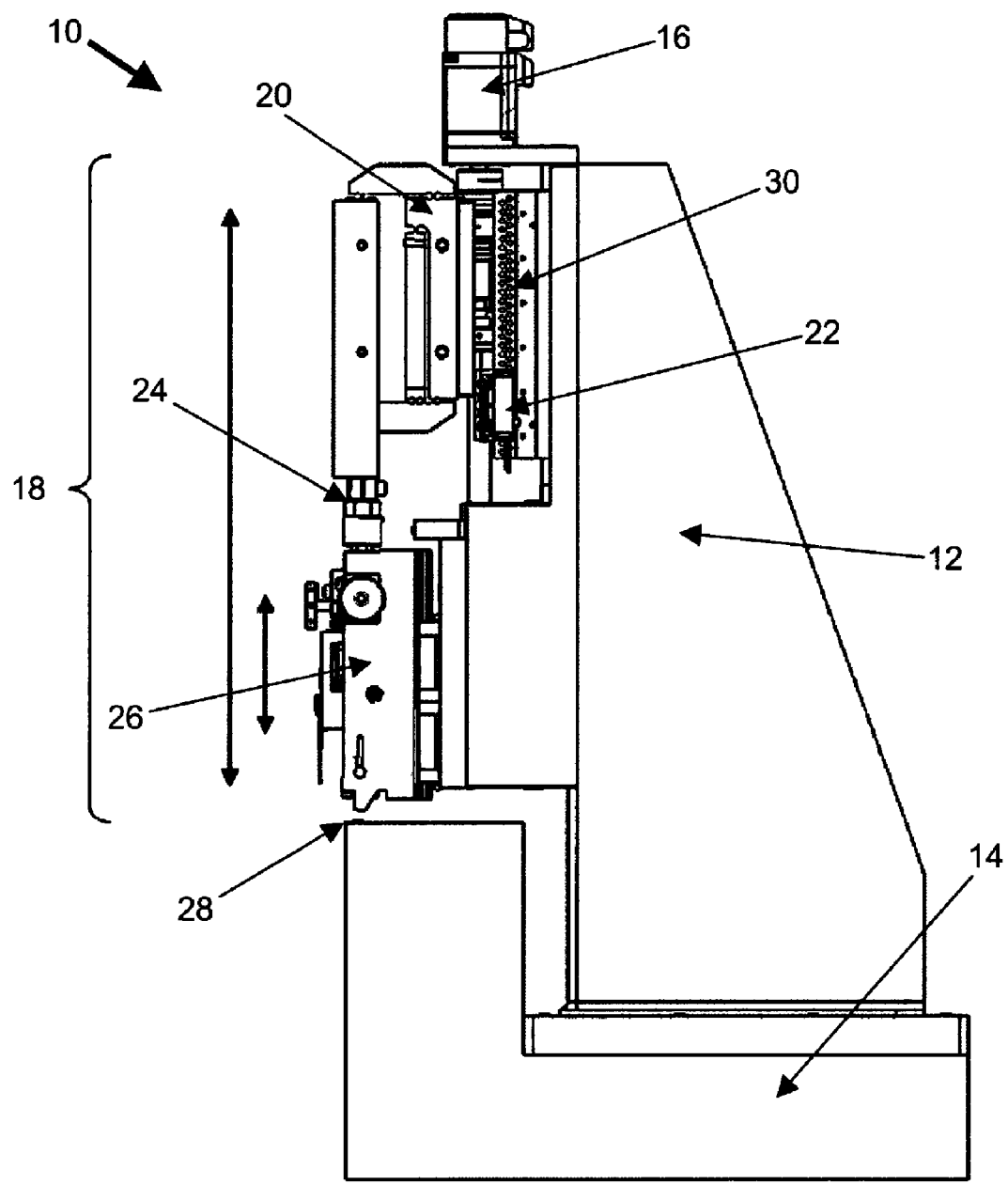
FIG. 2 is a side view of a bonding apparatus for bonding multiple dice simultaneously according to the preferred embodiment of the invention.

FIG. 2 is a side view of a bonding apparatus 10 for bonding multiple dice 28 simultaneously according to the preferred embodiment of the invention. It shows the general configuration of the apparatus 10 for bonding multiple dice 28 onto a substrate below a bonding tool 26. The substrate is affixed to a base 14. The basic structure of the apparatus 10 comprises a stand 12, the base 14, a linear motion actuator 16 and a plurality of bond heads 18. The illustrated embodiment shows two bond heads 18a, 18b (see FIG. 4). Each bond head 18a, 18b includes a compliant mechanism 20, a linear guide 30, a locking mechanism 22, a force sensor 24 and the bonding tool 26. The linear guide 30 is coupled between the stand 12 and the bond heads 18 and the force sensor 24 is coupled to each bond head 18a, 18b. The said compliant mechanism 20, locking mechanism, force sensor 24 and bonding tool 26 are driven together with a movable part of the linear guide 30 which guides movement of the bond heads 18 while they are driven by the linear motion actuator 16. The force sensor 24 detects a reaction force from the base 14 acting on the bonding tool 26 when there is contact between the dice 28 and the substrate.

The stand 12 and base 14 form a mounting frame for the plurality of bond heads 18 and for the linear motion actuator 16. The static parts of the linear motion actuator 16 and the linear guide 30 are directly coupled to the stand 12. The movable part of the linear motion actuator 16 is coupled to the movable part of the linear guide 30 in such a way that actuation forces provided by the linear motion actuator 16 drive the bond head 18 to move along the axis of the linear guide 30, which is indicated by the vertical arrow in FIG. 2.

Figure 3:
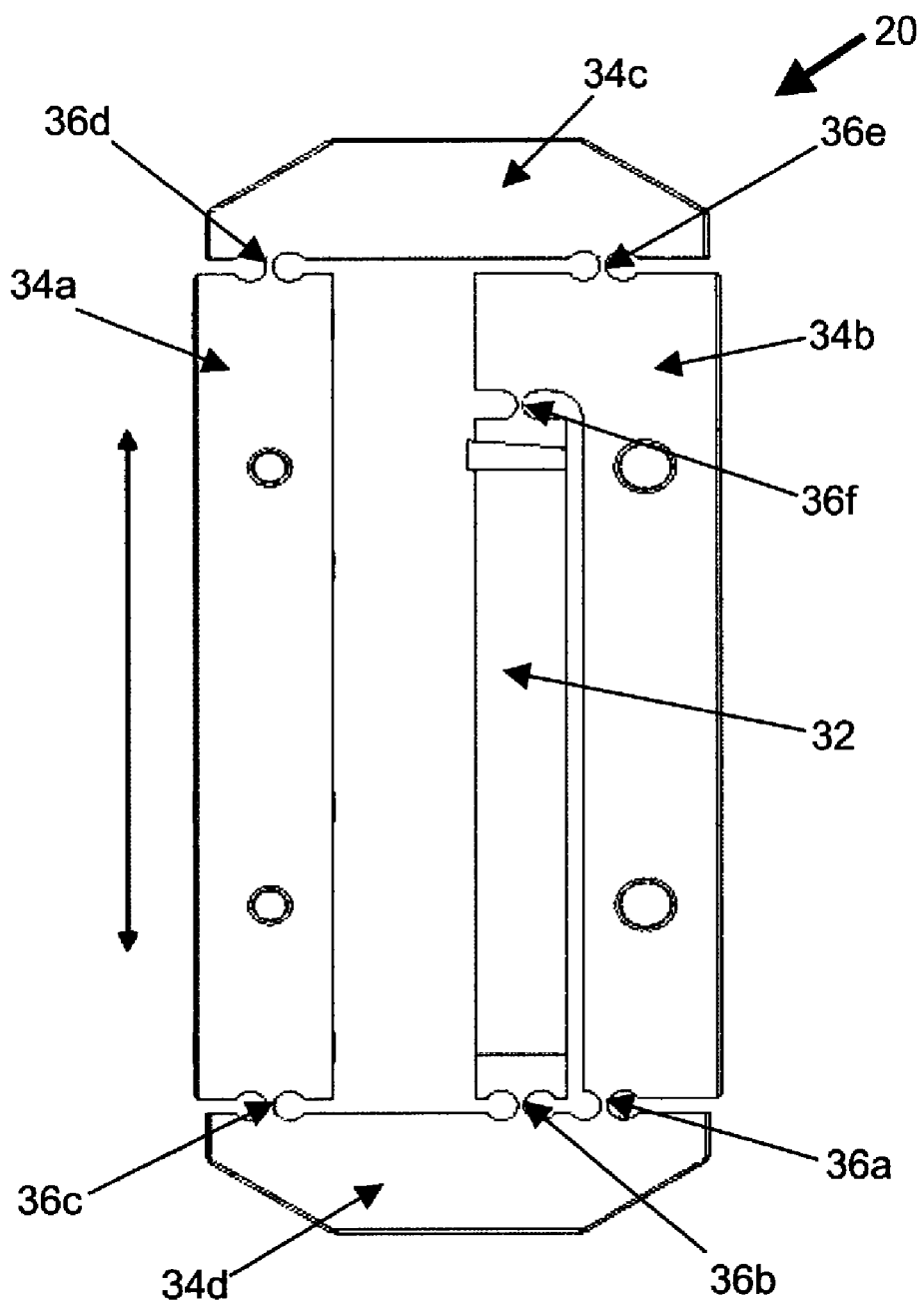
FIG. 3 is a plan view of a compliant mechanism comprising multiple flexures aligned along an actuation direction of a linear motor actuator.

FIG. 3 is a plan view of a compliant mechanism 20 comprising multiple flexures aligned along an actuation direction of the linear motor actuator 16. The compliant mechanism 20 in the bond head 18 is actuable to generate and exert a bonding force on the bonding tool 26 along the guiding axis of the linear guide 30 when the die 28 held by the bonding tool 26 contacts the substrate on the base 14 to bond each die 28 to the substrate. The compliant mechanism 20 comprises a piezoelectric element 32 and six flexures 36a-f aligned in the actuation direction as shown by the vertical arrow in FIG. 3. This alignment helps the flexures 36a-f to reduce shear stresses when the piezoelectric element 32 expands upon being electrically excited. The expanded piezoelectric element 32 pushes the lower middle flexure 36b. The motion of the lower middle flexure 36b forces the upper and lower beams 34c, 34d to rotate. When the piezoelectric element expands, these parallel beams form a quadrilateral shape such as a parallelogram with the left and right beams 34a, 34b and the left beam 34a moves in such a way as to maintain the parallelogram formation. The left beam 34a of the said compliant mechanism 20 is coupled to the bonding tool 26 and is guided by the movable part of linear guide 30. With such a structure of the compliant mechanism 20, a force exceeding 40 kgf can be generated with a compliant mechanism 20 length of only about 10 mm.

The left beam 34a of the compliant mechanism 20 is coupled to the bonding tool 26 whereas the right beam 34b is coupled to the locking mechanism 22. The locking mechanism 22 is a clamp to secure the position of the right beam 34b of the said compliant mechanism 20 as shown in FIG. 3 and it couples the movable part of the linear guide 30 to the stand 12. The locking mechanism 22 may be actuated by electromagnetic or pneumatic means with a holding or locking force that is greater than the bonding force provided by the compliant mechanism 20 such that skidding of the whole bond head 18 will not occur when the piezoelectric element 32 of the compliant mechanism 20 is energized.

Figure 4:
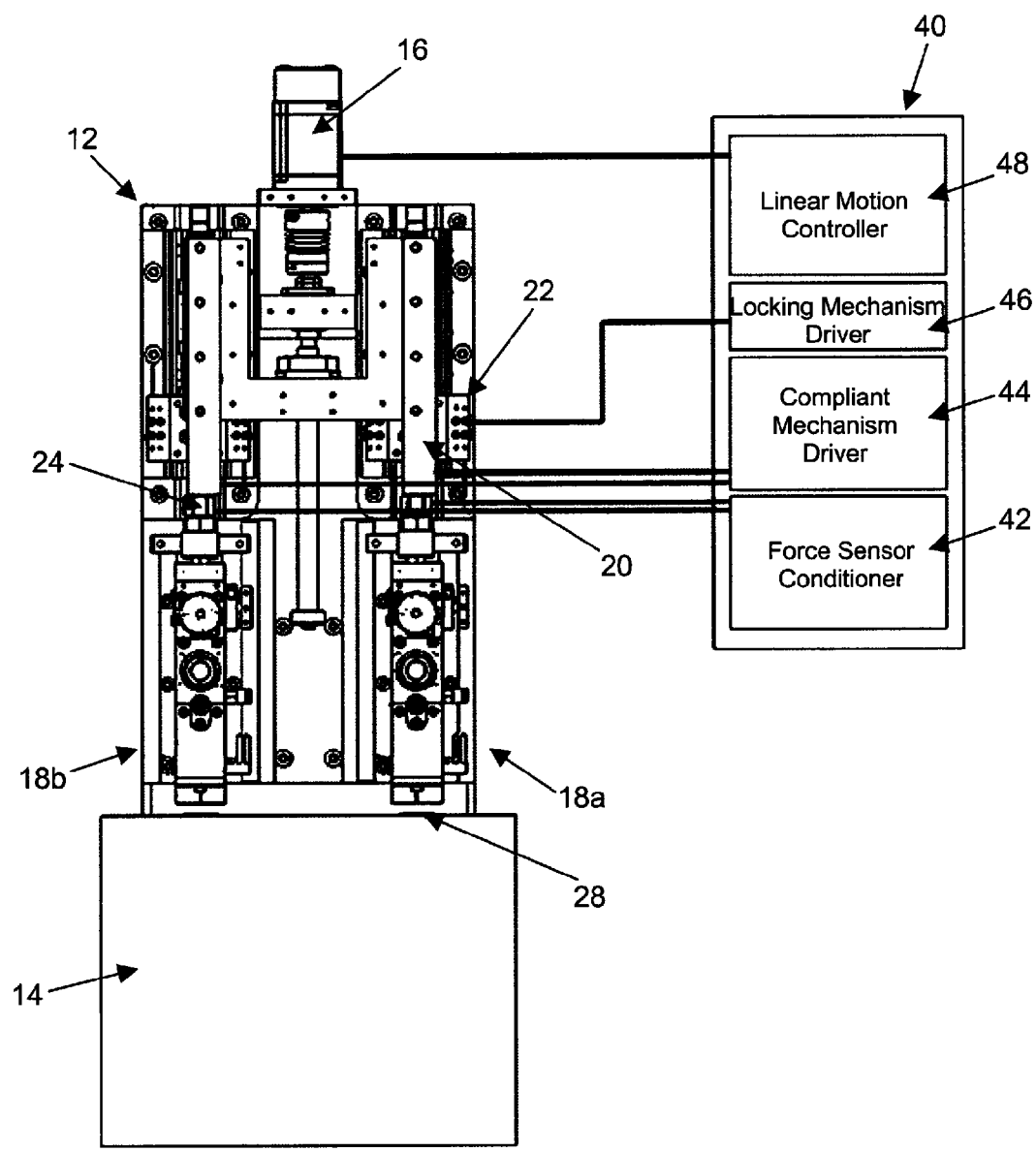
FIG. 4 is a front view of the bonding apparatus of FIG. 2 showing its connections to a controller.

FIG. 4 is a front view of the bonding apparatus of FIG. 2 showing its connections to a controller 40. Inside the controller 40 are a force sensor conditioner 42, compliant mechanism driver 44, a locking mechanism driver 46 and a linear motion controller 48 for controlling the compliant mechanism 20, locking mechanism 22 and the linear motion actuator 16 respectively.

The operation of the apparatus starts when the linear motion actuator 16 brings both the bond heads 18a, 18b down towards the substrate on the base 14. The linear motion actuator 16 searches for contact between the bonding tools 26 and the base 14 through force signals which are captured by the force sensor 24 so that the point at which the dice 28 contact the substrate can be determined. Once contact has been made, the linear motion controller 48 registers this position and the linear motion actuator 16 drives the bond heads 18 in to apply a preload force from the bonding tool 26 onto the dice 28 and the substrate.

The locking mechanism 22 is then energized and locks the compliant mechanism 20 and hence the bond heads 18a, 18b in its current position to the stand 12. To protect the linear motion actuator 16 from damage by the forces generated by the compliant mechanism 20, the linear motion actuator 16 will be switched off and deactivated so that it no longer drives the bond heads 18 when the bond heads 18 are locked to the stand 12. The positions of the bond heads 18 are now wholly supported by the locking mechanism 22 rather than by the linear motion actuator 16, and the forces generated by the compliant mechanism 20 are now directed to the locking mechanism 22 and onto the stand 12. Each compliant mechanism 20 is actuated by electrical excitation to expand in order to apply bonding forces on the bonding tools 26 to bond the dice 28 to the substrate.

Figure 5:
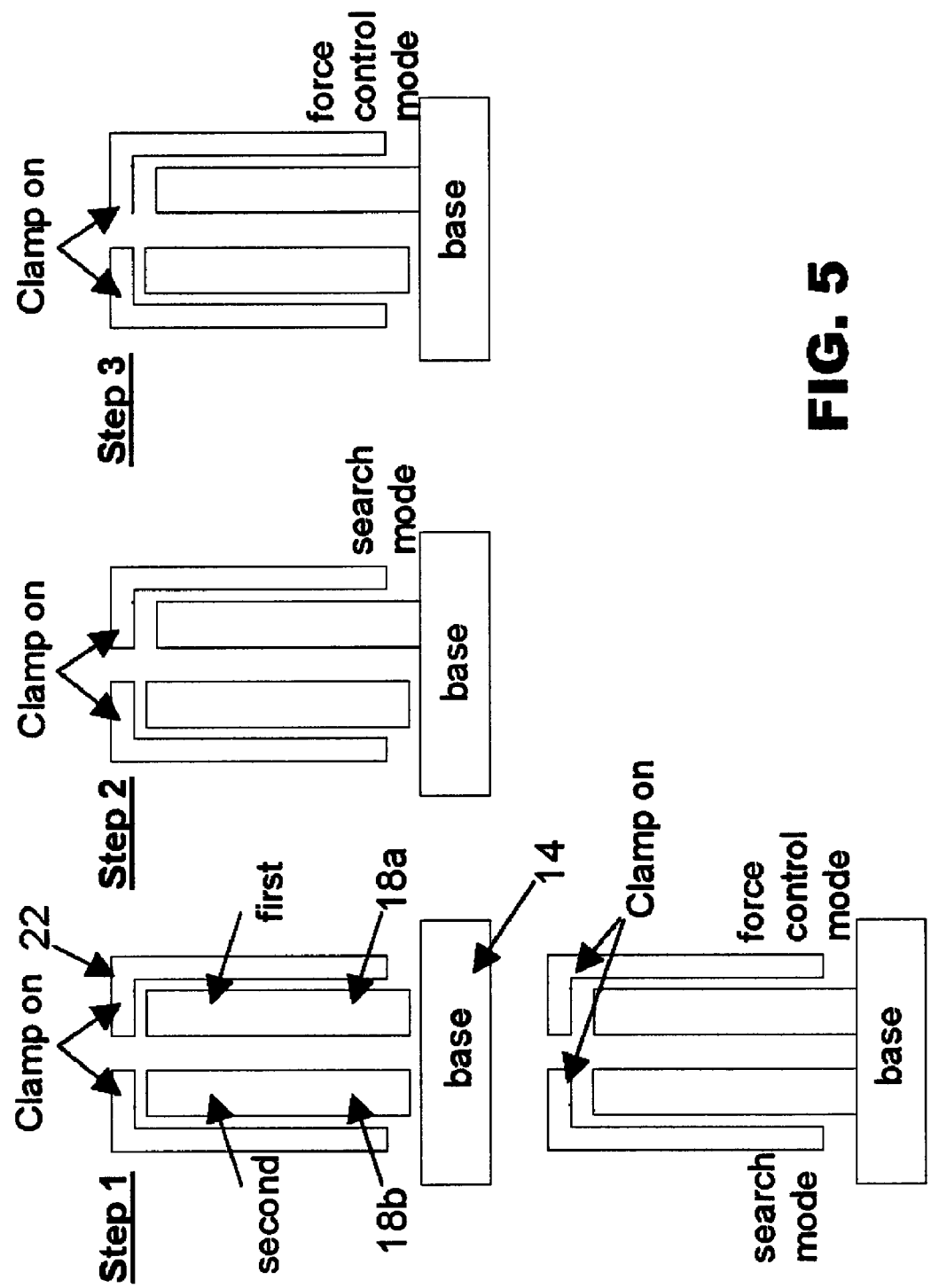
FIG. 5 is a schematic illustration of an operation process of the bonding apparatus in a dual arm mode.
Figure 6:
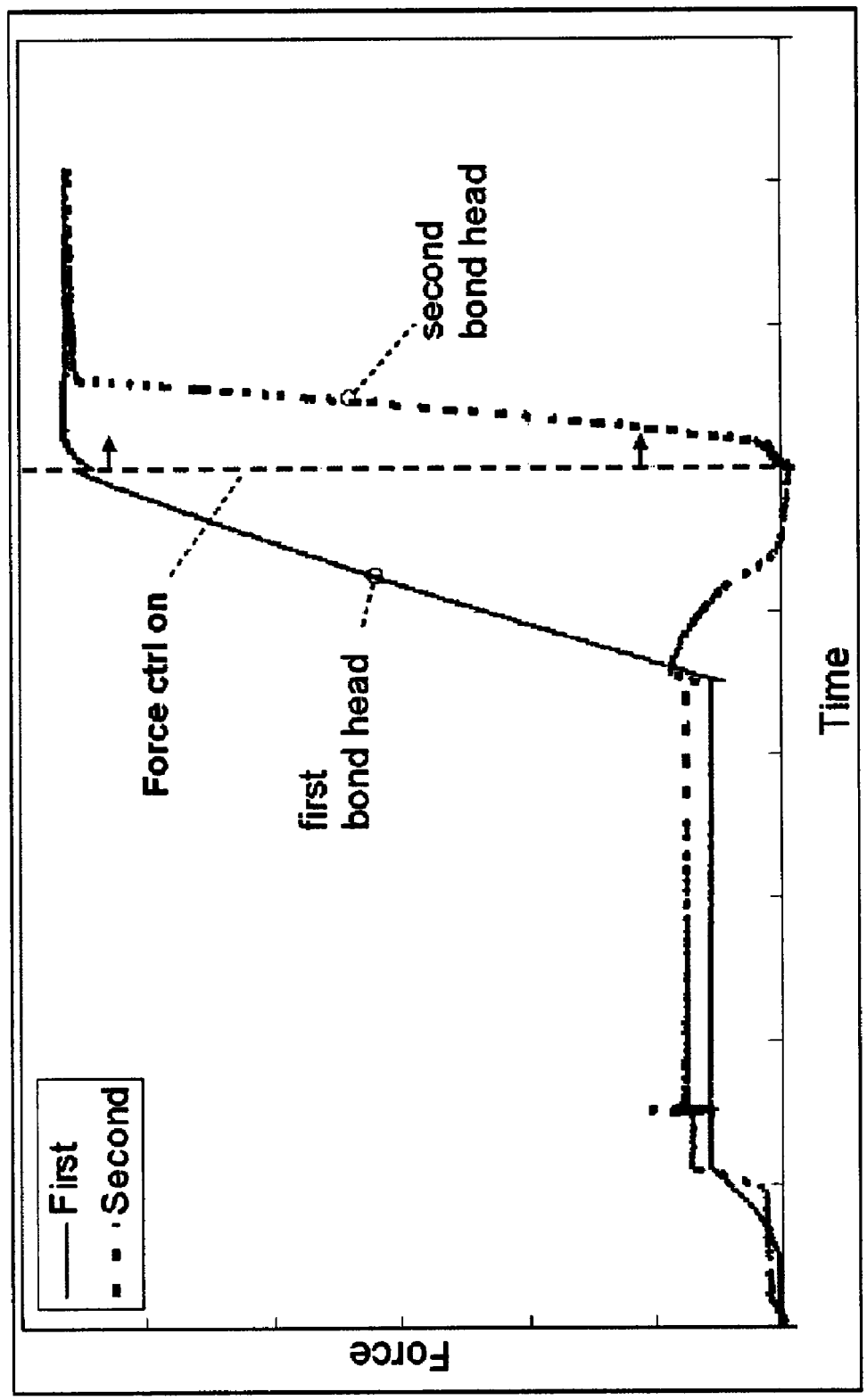
FIG. 6 is an exemplary graphical illustration of forces exerted by first and second bond heads when the bonding apparatus is in the dual arm mode.

Although the forces generated from the compliant mechanism 20 onto each bond head 18 is now coupled to the stand 12 through the locking mechanism 22, deformation of the stand 12 may still occur and affect the target forces generated on the bonding tool 26. In order to avoid deformation of the stand compromising the target forces, the bond heads 18 are thereafter operated in a dual arm mode as illustrated in FIG. 5 and FIG. 6.

After contact and the application of a preload force when the bond head 18 is at a designated level (step 1), the compliant mechanism 20 of the first bond head 18a will be actuated to press the first bond head 18a and its bonding tool 26 against the base 14 with a target bonding force which is generated while monitoring force signal feedback received from the force sensor 24 (step 2). The first bond head 18a then switches to a force control mode using the force signals received from the force sensor 24 and commands the compliant mechanism 20 to compensate for any changes (step 3). The compliant mechanism 20 of the second bond head 18b then presses the second bond head 18b and its bonding tool 26 against the base 14 with the target bonding force just as the first bond head 18a did (step 4).

Since the first bond head 18a is in the force control mode, any disturbance generated by the second bond head 18b and transmitted through the stand 12 and base 14 by the target bonding force will be balanced by the control bonding force generated by the first bond head 18a. Thus, the bonding forces exerted by the first and second bond heads 18a, 18b can be compensated and maintained at the target force level as shown in FIG. 6.

Therefore, it should be appreciated that the preferred embodiment of the invention allows the bonding of multiple dice 28 onto a substrate simultaneously with high bond forces. Each compliant mechanism 20 is actuated by a piezoelectric element 32 so that large forces can be applied onto a very small semiconductor die. The size of each actuation mechanism and the inter-bond head spacing may thus be reduced. With a compliant mechanism that has a length of only about 10 mm, a bonding force of over 40 kgf can be generated. The bond head inter-spacing can be squeezed from 50 mm to about 30 mm so that simultaneously bonding multiple dice which are separated by a small pitch can be achieved.

A locking mechanism 22 is constructed to lock the static part of the compliant mechanism 20 so that a reaction force from the compliant mechanism 20 passes through the locking mechanism 22 rather than through the linear motion actuator 16, which avoids damage to the linear motion actuator 16. The bonding tool includes a force sensor 24 to monitor the magnitude of forces applied onto the die 28 and compensates the coupling of forces from other bond heads 18 through a force sensor 24 and controller 40.

The invention described herein is susceptible to variations, modifications and/or addition other than those specifically described and it is to be understood that the invention includes all such variations, modifications and/or additions which fall within the spirit and scope of the above description.

The invention claimed is:

1. Apparatus for bonding dice onto one or more substrates placed on a base, the apparatus comprising:
   a first bond head and a second bond head, each incorporating a bonding tool configured for holding a die;
   at least one linear motion actuator for driving both the first and second bond heads towards the substrate; and
   a stand on which the first and second bond heads are mounted;
   wherein each bond head further comprises a locking mechanism operative to lock the bond head to the stand, and a compliant mechanism that is aligned along an actuation direction of the linear motion actuator to generate the bonding force on the bonding tool, and is actuable to exert a bonding force on the bonding tool to bond each die to the substrate after the bond head has been locked to the stand; and
   wherein the compliant mechanism comprises a plurality of flexures aligned in the actuation direction and a piezoelectric element that is configured to expand when it is electrically excited.

2. Apparatus as claimed in claim 1, further comprising at least one linear guide coupled between the stand and the bond heads for guiding movement of the bond heads while they are driven by the linear motion actuator.

3. Apparatus as claimed in claim 2, wherein the compliant mechanism comprises at least four beams which form a quadrilateral shape in the form of a parallelogram when the piezoelectric element expands.

4. Apparatus as claimed in claim 3, wherein one beam of the compliant mechanism is coupled to the bonding tool and a movable part of the linear guide.

5. Apparatus as claimed in claim 4, wherein a beam opposite to the beam coupled to the bonding tool is coupled to the locking mechanism.

6. Apparatus as claimed in claim 1, wherein a locking force exerted by the locking mechanism is greater than the bonding force exerted by the compliant mechanism.

7. Apparatus as claimed in claim 1, further comprising controllers for controlling the compliant mechanism, locking mechanism and linear motion actuator.

8. Apparatus as claimed in claim 1, further comprising a force sensor coupled to each bond head which is operative to detect a reaction force from the base acting on the bonding tool.

9. Apparatus as claimed in claim 1, wherein the linear motion actuator is operative to apply a preload force from the bonding tool onto the base.

10. Method for bonding dice onto one or more substrates placed on a base, comprising the steps of:
    holding first and second dice with first and second bonding tools incorporated in respective first and second bond heads;
    driving the first and second bond heads towards the substrate with at least one linear motion actuator so that the dice contact the substrate;
    locking, by a locking mechanism, the first and second bond heads to a stand on which the first and second bond heads are mounted; and thereafter
    actuating first and second compliant mechanisms located on the first and second bond heads respectively to apply bonding forces on the bonding tools to bond the dice to the substrate,
    wherein each of the first and second compliant mechanisms is aligned along an actuation direction of the linear motion actuator to generate the respective bonding force on the bonding tool, and
    wherein each of the first and second compliant mechanisms comprises a plurality of flexures aligned in the actuation direction and a piezoelectric element that is configured to expand when it is electrically excited.

11. Method as claimed in claim 10, further comprising the step of deactivating the linear motion actuator once the first and second bond heads are locked to the stand.

12. Method as claimed in claim 10, wherein the step of actuating the first and second compliant mechanisms further comprises the steps of first actuating the first compliant mechanism to press the first bonding tool against the first die with a target bonding force, switching the first bond head to a force control mode, and thereafter actuating the second compliant mechanism to press the second bonding tool against the second die with the target bonding force while balancing the target bonding force on the second bonding tool with a control force from the first bonding tool.

13. Method as claimed in claim 12, further comprising the step of using a force sensor coupled to each bond head for controlling the bonding force and the control force.

14. Method as claimed in claim 10, further comprising the step of coupling a force sensor coupled to each of the first and second bond heads for detecting a reaction force from the base acting on the bonding tools.

15. Method as claimed in claim 10, wherein a locking force exerted by the locking mechanism is greater than the bonding force provided by the compliant mechanism.

16. Method for bonding dice onto one or more substrates placed on a base, comprising the steps of:
    holding first and second dice with first and second bonding tools incorporated in respective first and second bond heads;
    driving the first and second bond heads towards the substrate with at least one linear motion actuator so that the dice contact the substrate;
    applying a preload force on the dice after contact of the dice on the substrate is detected;
    locking, by a locking mechanism, the first and second bond heads to a stand on which the first and second bond heads are mounted; and thereafter
    actuating first and second compliant mechanisms located on the first and second bond heads respectively to apply bonding forces on the bonding tools to bond the dice to the substrate.

* * * * *